(12) United States Patent
Neumeier et al.

(10) Patent No.: US 11,582,537 B2
(45) Date of Patent: Feb. 14, 2023

(54) DYNAMIC CONTENT SERVING USING A MEDIA DEVICE

(71) Applicant: INSCAPE DATA, INC., Irvine, CA (US)

(72) Inventors: Zeev Neumeier, Berkeley, CA (US); Brian Reed, Darien, CT (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 17/068,540

(22) Filed: Oct. 12, 2020

(65) Prior Publication Data

US 2021/0112313 A1 Apr. 15, 2021

Related U.S. Application Data

(60) Provisional application No. 62/914,775, filed on Oct. 14, 2019.

(51) Int. Cl.
*H04N 21/84* (2011.01)
*H04N 21/845* (2011.01)
*H04N 21/44* (2011.01)
*H04N 21/234* (2011.01)
*H04N 21/81* (2011.01)

(52) U.S. Cl.
CPC ... *H04N 21/8456* (2013.01); *H04N 21/23418* (2013.01); *H04N 21/44008* (2013.01); *H04N 21/812* (2013.01)

(58) Field of Classification Search
CPC ......... H04N 21/8456; H04N 21/23418; H04N 21/44008; H04N 21/812; H04N 21/235; H04N 21/435; H04N 21/8358; H04N 21/4438; H04N 21/4316; H04N 21/4331; H04N 21/44016
See application file for complete search history.

(56) References Cited

U.S. PATENT DOCUMENTS

| | | | | |
|---|---|---|---|---|
| 5,867,227 | A * | 2/1999 | Yamaguchi | H04N 21/4821 348/565 |
| 6,636,271 | B1 * | 10/2003 | Megeid | H04N 5/602 348/559 |
| 2002/0194595 | A1 * | 12/2002 | Miller | H04N 21/4542 348/E7.083 |
| 2004/0194134 | A1 * | 9/2004 | Gunatilake | H04N 5/50 725/38 |

(Continued)

FOREIGN PATENT DOCUMENTS

WO 2020/036796 A1 2/2020

OTHER PUBLICATIONS

International Search Report and Written Opinion for PCT Application No. PCT/US2020/055360 dated Jan. 28, 2021; 10 pages.

*Primary Examiner* — Jefferey F Harold
*Assistant Examiner* — Timothy R Newlin
(74) *Attorney, Agent, or Firm* — Polsinelli LLP

(57) ABSTRACT

Methods, systems, devices, and computer-program products are described herein for providing dynamic content serving. The dynamic content serving technology can identify, in real-time, programming arriving at a client device, identify a specific media segment being received and/or displayed, and determine which pre-stored substitute media segment may be used to replace the identified segment. A picture-in-picture channel can be used to display the substitute media segment.

20 Claims, 14 Drawing Sheets

(56) References Cited

U.S. PATENT DOCUMENTS

| | | | | |
|---|---|---|---|---|
| 2007/0110393 A1* | 5/2007 | Jang | ............... | H04N 5/76 |
| | | | | 386/292 |
| 2008/0092158 A1* | 4/2008 | Bhatnagar | ............ | H04N 21/812 |
| | | | | 725/34 |
| 2008/0174448 A1* | 7/2008 | Hudson | ............... | A63H 30/04 |
| | | | | 340/4.37 |
| 2010/0182505 A1* | 7/2010 | Jilagam | ............. | H04N 21/4312 |
| | | | | 348/553 |
| 2010/0325660 A1* | 12/2010 | Holden | ............... | G11B 27/10 |
| | | | | 725/34 |
| 2011/0004892 A1* | 1/2011 | Dharmaji | ............ | H04N 21/8455 |
| | | | | 725/9 |
| 2012/0028660 A1* | 2/2012 | Stafford | ............... | H04W 4/12 |
| | | | | 455/466 |
| 2012/0117584 A1* | 5/2012 | Gordon | ............. | H04N 21/8133 |
| | | | | 725/19 |
| 2014/0201769 A1 | 7/2014 | Neumeier et al. | | |
| 2014/0282695 A1* | 9/2014 | Bakar | ............... | H04N 21/812 |
| | | | | 725/32 |
| 2016/0055606 A1* | 2/2016 | Petrovic | ............ | H04N 21/4627 |
| | | | | 382/100 |
| 2017/0017645 A1* | 1/2017 | Neumeier | ............ | H04N 21/8456 |
| 2017/0048559 A1* | 2/2017 | Hoarty | ............... | H04N 21/235 |
| 2018/0343476 A1 | 11/2018 | Loheide et al. | | |
| 2019/0089999 A1 | 3/2019 | Neumeier et al. | | |

* cited by examiner

1300

```
┌─────────────────────────────────────────────┐
│ Determine, By A Computing Device, Candidate │
│ Portions Of A Video Channel For Content     │
│ Substitution                                │
└─────────────────────────────────────────────┘
                      ↓
┌─────────────────────────────────────────────┐
│ Configure A Picture-in-picture Window For   │
│ Display Of The One Or More Substitute       │
│ Video Segments                              │
└─────────────────────────────────────────────┘
                      ↓
┌─────────────────────────────────────────────┐
│ Identify Watermark Data In A Video Frame Of │
│ The Video Channel, The Watermark Data       │
│ Indicating A Presence Of A Candidate        │
│ Portion Of The Video Channel For Content    │
│ Substitution                                │
└─────────────────────────────────────────────┘
                      ↓
┌─────────────────────────────────────────────┐
│ Obtain At Least A Portion Of A Substitute   │
│ Video Segment Corresponding To The          │
│ Candidate Portion Of The Video Channel,     │
│ Wherein The Substitute Video Segment Is     │
│ Obtained In Response To Identifying The     │
│ Watermark Data                              │
└─────────────────────────────────────────────┘
                      ↓
┌─────────────────────────────────────────────┐
│ Display At Least The Portion Of The         │
│ Substitute Video Segment In The             │
│ Picture-in-picture Window, The Substitute   │
│ Video Segment Replacing A Video Segment     │
│ Included In The Video Channel With The      │
│ Substitute Video Segment                    │
└─────────────────────────────────────────────┘
```

Fig. 13

DYNAMIC CONTENT SERVING USING A MEDIA DEVICE

CROSS-REFERENCE TO RELATED APPLICATIONS

This application claims the benefit of and priority to U.S. Provisional Patent Application No. 62/914,775, filed on Oct. 14, 2019, the contents of which are hereby expressly incorporated by reference in their entirety.

FIELD

The present application is generally related to implementing dynamic content serving using a media device.

SUMMARY

Systems and techniques are described herein for implementing dynamic content serving using a media device. For instance, the dynamic content serving systems and techniques can substitute (e.g., in real-time or in near-real-time) one media segment for another media segment within a media stream with high accuracy and low latency. The media segment can include a video segment or other type of media (e.g., audio). In some cases, the media segment to be substituted into the media stream can be stored locally (e.g., stored in a cache memory or other local storage) on a media device playing the media stream. In some cases, the entire media segment or a portion of the media segment to be substituted into the media stream can be obtained (e.g., in real-time or near real-time) over a network from a content source. In some implementations, the media segment to be substituted into the media stream can be marked with an identifying watermark in a portion of the video data and/or audio data of the media segment.

In one illustrative example, the systems and techniques can perform dynamic content insertion, where a first item of third party content can be "spliced" into a video stream being displayed by a display device (e.g., a television) to replace a second item of third party content that was originally part of the original video programing. By substituting the first item of third party content into the video stream, the viewer of the video stream can see different content than what other viewers of the same video stream might see on their respective display devices. The determination of the third party content that is to be substituted for a specific viewer can be determined by a demographic profile of the viewer, a zip code of the viewer, and/or any other information.

Content substitution for various types of content requires precise timing (e.g., one-tenth of a second or other time period), since additional delay can cause the inserted content to lack visual quality. To achieve the strict timing required to substitute one media segment for another media segment, a watermark embedded in the program stream (e.g., a video watermark embedded into the video data of a video stream) can be used as a trigger to initiate certain actions of the dynamic content serving system. As noted above, in some cases, content that can be used for substitution can be stored locally (e.g., in cache memory) on a client device (e.g., a television, a mobile device, a set-top box, and/or other suitable client device), so that the content can be quickly accessed and used as a substitute for existing content. In some cases, part of the content or the entire content can be obtained from a content source (e.g., from one or more servers storing the content).

Furthermore, the electronic circuits of modern display devices and media processing devices (e.g., televisions, set-top boxes, etc.) are limited in their ability to rapidly switch video signals. To address this, the dynamic content serving systems and techniques described herein can utilize a picture-in-picture (PIP) video path available in display devices and media processing devices. In general, a PIP video path allows one media stream (e.g., a television channel, a movie, or other media) to be displayed in a PIP window at the same time (e.g., as an overlay, an inset window, or the like) as a second media stream being displayed on the full display in a full screen mode. In preparation for displaying one or more substitute media segments, the techniques and systems described herein can establish a PIP frame with a dimension of 0×0 so that a PIP window is not visible when displayed with a full screen media stream. A media segment to be substituted at a given watermark trigger time is cued to play in the PIP window. When the watermark trigger is detected, the system can expand the existing PIP window from the 0×0 dimension to a larger dimension or to full-screen (in which case the PIP window is to be displayed in substitution of the original video segment).

In some examples, the techniques and systems described herein can perform additional processes prior to playout of the substitute media segment, such as decoding in advance the compressed video stream and then applying the stream to the PIP input process. Further details are described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 13 is a flow chart illustrating an example of a process for performing content substitution.

DETAILED DESCRIPTION

Figure 1:
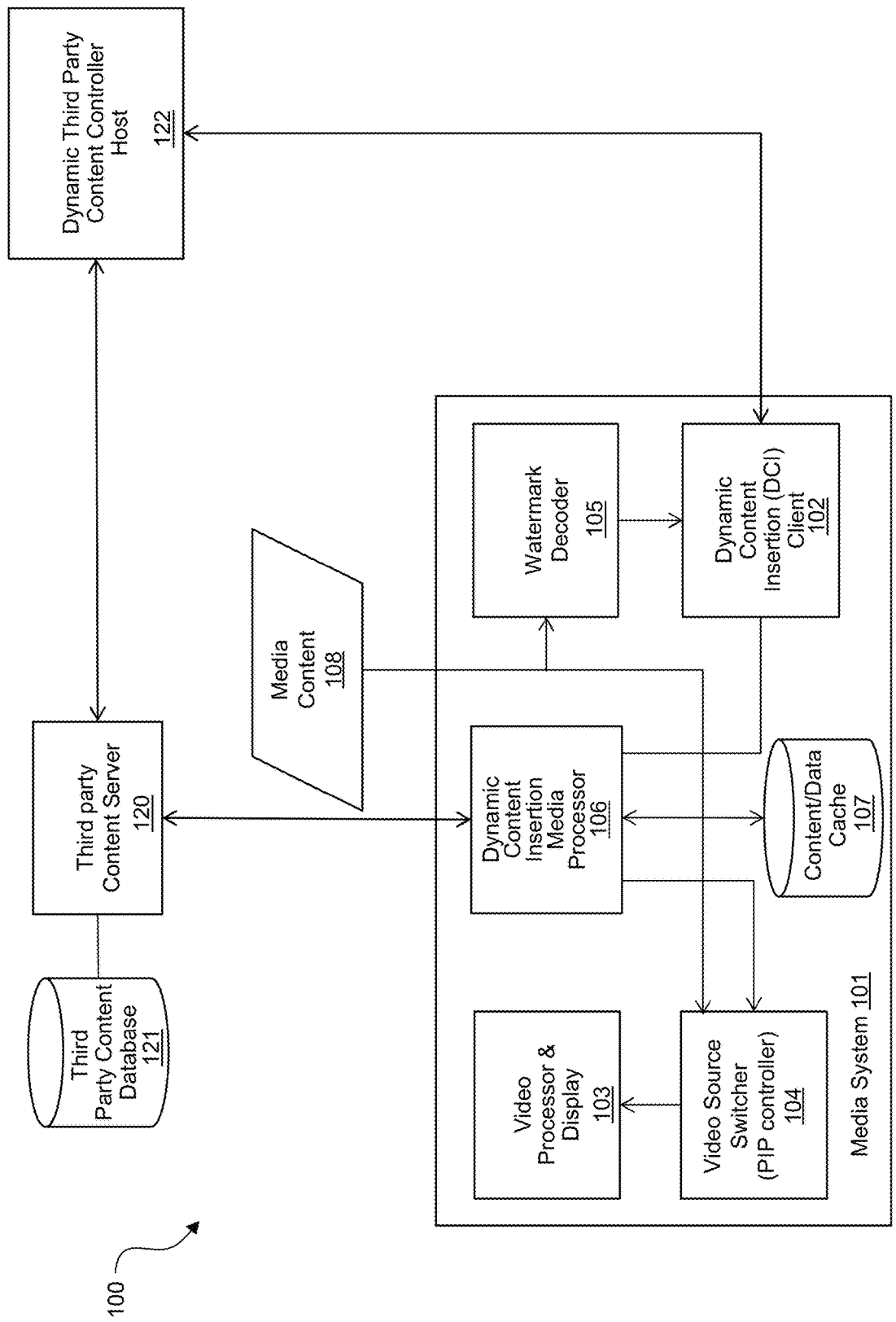
FIG. 1 is a high-level system diagram illustrating an example of a dynamic content serving system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

During early years of television and the growth of third party content-supported programming (e.g., advertising-supported programming), messages displayed on home televisions by necessity only promoted products or services with a relatively broad appeal. Because all viewers viewed the same third party content, companies generally targeted broad markets that would likely be tuned-in during a respective daypart. A daypart is a part of a day in which media content (e.g., television content) is divided. As cable television networks developed, and eventually became known as "multichannel video programming distributors" (MVPD), the ability to target some third party content on a regional, instead of a nationwide, basis enabled the presentation of third party content for more localized products and services, and attracted attempts to exploit known demographic preferences.

By the early 1990's, technologies were being developed with the intent to further divide-up or "cellularize" certain large MVPD systems, which enabled the targeting of specific neighborhoods with more relevant third party content. The shift to digital broadcasting of TV programing in the early 2000's and the parallel proliferation of more-advanced video distribution methodologies, such as digital cable, digital satellite, and broadband Internet service, was combined with network-connected televisions (referred to as smart televisions or smart TVs), smartphones, tablets, laptops, and other devices for viewing video programming.

Such advances in media distribution and display technologies have created an infrastructure that offers the opportunity for the development of systems and methods to display third party content messages on multiple devices and coordinate certain messages to the same user across those devices. Further, third party content may be substituted in real-time for the existing message, based on location or demographic information about a certain household; a process known as dynamic content insertion (DCI) and third party content redirection (also referred to as dynamic advertisement insertion and advertisement redirection).

Dynamic content serving systems, methods (also referred to as processes), and computer-readable media are described herein for implementing dynamic content serving. An example of the dynamic content servicing includes dynamic content insertion (DCI) and dynamic content re-direction. For example, the techniques described herein can be used to substitute (e.g., in real-time or in near-real-time) one media segment for another media segment within a media stream with high accuracy and low latency. The media segment to be substituted into the media stream can be stored locally (e.g., stored in a cache memory or other local storage) on a media device playing the media stream. In some examples, the entire media segment or part of the media segment (e.g., a portion of the media segment after an initial part of the media segment) can be obtained in real-time over a network from a content source. In some implementations, the media segment to be substituted into the media stream can be marked with an identifying watermark in a portion of the video data and/or audio data of the media segment.

The media content for which segments are substituted can include any type of media content, such as video, audio, media that includes both audio and video content, or other type of media content. While examples are described herein using video as an example, one of ordinary skill will appreciate that the techniques described herein can apply to other types of media content. Further, when discussing video content herein, the video can include audio content in some cases. The media segments that can be substituted for other media segments can include any media content, such as third party content (e.g., an advertisement or commercial message), a movie, a television show, an on-demand show (e.g., offered through a streaming video service, broadcast video service, etc.), or other media content.

In one illustrative example, the dynamic content serving system and associated techniques can perform DCI in response to a triggering event, such as watermark data. For example, in response to detecting a watermark in a video frame of a video stream being displayed by a display device (e.g., a television), a first video segment (e.g., a first item of third party content) can be "spliced" into the video stream to replace a second video segment (e.g., a second item of third party content) that was originally part of the original video programing. For example, the dynamic content serving system can identify video segments, such as third party content items (e.g., advertisements) arriving at a display device, can identify the specific video segment being received (e.g., by identifying a video watermark and/or audio watermark), and can determine in real-time (or near-real-time) an alternative video segment to be substituted for the original video segment.

By substituting the first item of third party content into the video stream, the viewer of the video stream can see different content than what other viewers of the same video stream might see on their respective display devices. For instance, the display of a certain television third party content item being broadcast as part of a television program can be substituted with a different third party content item, such as an item of third party content that is predetermined to be more relevant for that particular household or user. The determination of the third party content that is to be substituted for a specific viewer can be determined by a demographic profile of the viewer, a zip code of the viewer, and/or any other information.

Such third party content substitution is dynamic so that it can occur any time a third party content item that is eligible to be replaced is detected to be currently displayed by a media device (e.g., a network-connected or smart TV, a set-top box, a personal computer, a mobile phone, a tablet computer, and/or other media device). In one example, techniques described herein address an existing need to more narrowly target third party content to specific audiences to keep television third party content offerings (e.g., advertising) competitive with alternative digital media platforms, among other uses.

Using watermark data or other means for triggering substitution of media segments can be used to satisfy the precise timing requirements for performing content substitution for some content, where any additional delay (also referred to as latency), can be visually objectionable to a TV viewer and/or can cause visual confusion, among other undesirable artifacts. A video watermark embedded in program stream where the substitution is to occur is an effective triggering mechanism for precise timing of the dynamic content serving system when performing DCI. Another example of a method of triggering a media segment substitution event can include a video matching system internal to the media device to identify video segments being displayed, product logos, entire video frames, or other portion of a video stream being displayed. Another example of a method of triggering a media segment substitution event can include decoding an audio watermark signal to trigger. Other methods can also be used to trigger substitution of media segments.

FIG. 1 is a high-level diagram of various components of an example of a dynamic content serving system 100. The dynamic content serving system 100 includes various components, including a media system 101, a third party content server 120, and a dynamic third party content controller host 122. The media system 101 includes various components, including a dynamic content insertion (DCI) client 102, a video processor and a display 103 (shown as one block, but can be made up of different components), a video source switcher 104 (also referred to as a picture-in-picture (PIP) controller), a watermark decoder 105, a DCI media processor 106, and a content/data cache 107. The components of the dynamic content serving system 100, including the components of the media system 101, can include software, hardware, or both. For example, in some implementations, the components of the dynamic content serving system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the dynamic content serving system 100.

While the dynamic content serving system 100 is shown to include certain components, one of ordinary skill will appreciate that the dynamic content serving system 100 can include more or fewer components than those shown in FIG. 1. For example, the third party content server 120 and the dynamic third party content controller host 122 can include components not shown in FIG. 1. In some examples, the third party content server 120 and the dynamic third party content controller host 122 can be part of different computing devices (e.g., servers, personal computers, and/or other computing devices), or can be part of the same computing device.

In another example, the media system 101 can include, or can be part of a computing device that includes, one or more input devices (not shown), one or more output devices (not shown), one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

In one illustrative example, a computing device used to implement the media system 101 is a media device, such as a television (e.g., a network-connected or smart television), a set-top box, a personal computer, a tablet computer, a mobile device (e.g., a mobile phone or other mobile device), a wearable device (e.g., a smart watch, a virtual reality headset, an augmented reality headset, and/or other wearable device), a server (e.g., in a software as a service (SaaS) system or other server-based system), and/or any other computing device with the resource capabilities to perform the techniques described herein.

The third party content database 121 can include candidate media segments (referred to herein as third party content items) that can be substituted for other media segments (third party content items) that are scheduled to be presented with media content 108. The media content 108 can include any type of media content, such as television programming, streaming (or over-the-top (OTT)) content that can include shows, movies, or other content, any combination thereof, and/or other media content. The third party content items in the third party content database 121 can include advertisements, recommended media content (e.g., a movie, show, song, or other media to recommend to a user for viewing or listening), or other type of content. In one illustrative example, the media content 108 includes television programming and the third party content items in the third party content database 121 include commercials that can be substituted to replace commercials that are originally scheduled to play with the television programming.

In some examples, to achieve low latency in the provisioning of content substitution, the candidate third party content items can be stored locally in the media system 101 in the content/data cache 107. In some implementations, a local storage device other than cache can be used to store the third party content items, such as a database, random access memory (RAM), read only memory (ROM), or other storage mechanism. Storing the third party content items locally can allow the media system 101 to quickly retrieve and display a third party content item in response to detecting a trigger such as a watermark. In some cases, all available candidate third party content items can be received and stored locally by the media system 101. In some cases, only candidate third party content items that can be substituted for a currently-selected media content item (e.g., a television channel, a movie, a show, etc.) are received and stored locally by the media system 101. In one illustrative example, the media content 108 includes television programming as noted above. In response to the media system 101 changing to a particular television channel (e.g., in response to a user input), the DCI client 102 or the DCI media processor 106 can request all candidate third party content items that relate to the television channel from the third party content server 120. The third party content server 120 can then send the requested candidate third party content items and can store them in the content/data cache 107 or other local storage. In some cases, in the example of a television channel, the candidate third party content items that relate to a certain daypart or time period of the television channel (e.g., a next hour, from a certain starting time point to an ending time point such as from Noon to 5:00 pm, or other time period) can be requested from the third party content server 120.

In some cases, there can be too many third party content items for the media system 101 to store locally in the content/data cache 107 or other local storage. For instance, on a contemporary Multichannel Video Programming Distributor (MVPD) system, there can be many third party substitution opportunities across many television program channels that can be too numerous for a media device (e.g., a television) to store in an internal cache 107 or other local storage. In such cases, for example, techniques are provided that can advantageously assist in performing dynamic content insertion. In one illustrative example, the DCI client 102 or the DCI media processor 106 of the media system 101 can request from the third party content server 120 a set of partial media segments (e.g., video segments) representing a first portion of a plurality of candidate third party content items that can be substituted for a particular item of media content. The third party content server 120 can send the set of partial media segments to the DCI media processor 106 or the DCI client 102, which can send the partial media segments to the content/data cache 107 or other local storage. In one illustrative example, the media content 108 includes television programming as noted above. In response to the media system 101 changing to a particular television channel (e.g., in response to a user input), the DCI client 102 or the DCI media processor 106 can send a request to the third party content server 120 to return a set of partial media segments representing a first portion of all candidate third party content items that relate to the television channel. In some cases, in the example of a television channel, the partial media segments of candidate third party content items that relate to a certain daypart or time period of the television channel can be requested from the third party content server 120. The third party content server 120 can then send the requested partial media segments and can store them in the content/data cache 107 or other local storage.

In some examples, the length or duration of a partial media segment representing a first portion of a candidate third party content item can be the same or a certain amount greater (e.g., 100 milliseconds (msec), 200 msec, 500 msec, or other suitable amount of time) than the latency required to communicate a request to the third party content server 120 and to then receive the remainder of the third party content item (the rest of the third party content item in addition to the first portion) that is to be substituted based on detection of a trigger (e.g., decoded information from a watermark of a detected video segment detected by the watermark decoder 105). In one illustrative example, a worst case third party content item substitution system latency can be 90 msec from the time of detection of a video watermark by decoder 105 to a request from the DCI media processor 106 to the third party content server 120 and then to the start of reception of the remainder of the third party content item to be substituted. In such an example, the length of a partial media segment representing a first portion of a candidate third party content item that will be stored in advance of detecting the watermark can include 200 msec of the candidate third party content item. By storing an amount of the candidate third party content items equal to at least the duration of the latency noted above, the media system 101 can begin playing the partial media segment of a third party content item without delay, while obtaining the rest of the third party content item before the partial media segment is finished playing.

In some examples, a media substitution event (e.g., based on a detected watermark or other trigger) can result in the need for a third party content item that is not currently stored in the content/data cache 107 or other local storage. In such examples, DCI media processor 106 or the DCI client 102 can send a request to the third party content server 120 send a specific third party content item. The third party content server 120 can send the third party content item to the DCI media processor 106 or the DCI client 102, which can instruct the video processor and display 103 to display the third party content item once it is received and decoded.

In some examples, the third party content items that are candidates for substitution can be provided to the media system 101 from multiple, disparate third party content servers (in addition to the third party content server 120). Regardless of the number of third party content servers that can provide third party content, the dynamic third party content controller host 122 can provide a network management service as well as load balancing so that any one third party content server does not become overwhelmed by potentially too many simultaneous requests.

In some examples, the media system 101 can accommodate for the relatively high latency of the electronic circuits of modern media devices (e.g., televisions, set-top boxes, among others) that causes delays in the ability of the media devices to rapidly switch between video signals. For example, the media system 101 can utilize a picture-in-picture (PIP) video path. A PIP video path allows media content (e.g., a television channel, a movie, or other media) to be displayed in a PIP window at the same time (e.g., as an overlay, an inset window, or the like) as other media content that is being displayed in a full screen mode. In preparation for displaying one or more substitute third party content items, the media system 101 can establish a PIP frame with a dimension of zero-by-zero (0×0) so that a PIP window is not visible when displayed at the same time as a full screen media stream is displayed. A third party content item to be substituted can be cued to play in the PIP window in response to a trigger (e.g., when a watermark is detected). When the trigger is detected, the system can expand the existing PIP window from the 0×0 dimension to a larger dimension and/or to full-screen. When displayed in full-screen, the third party content item in the PIP window is displayed in substitution of the original video segment.

Figure 2:
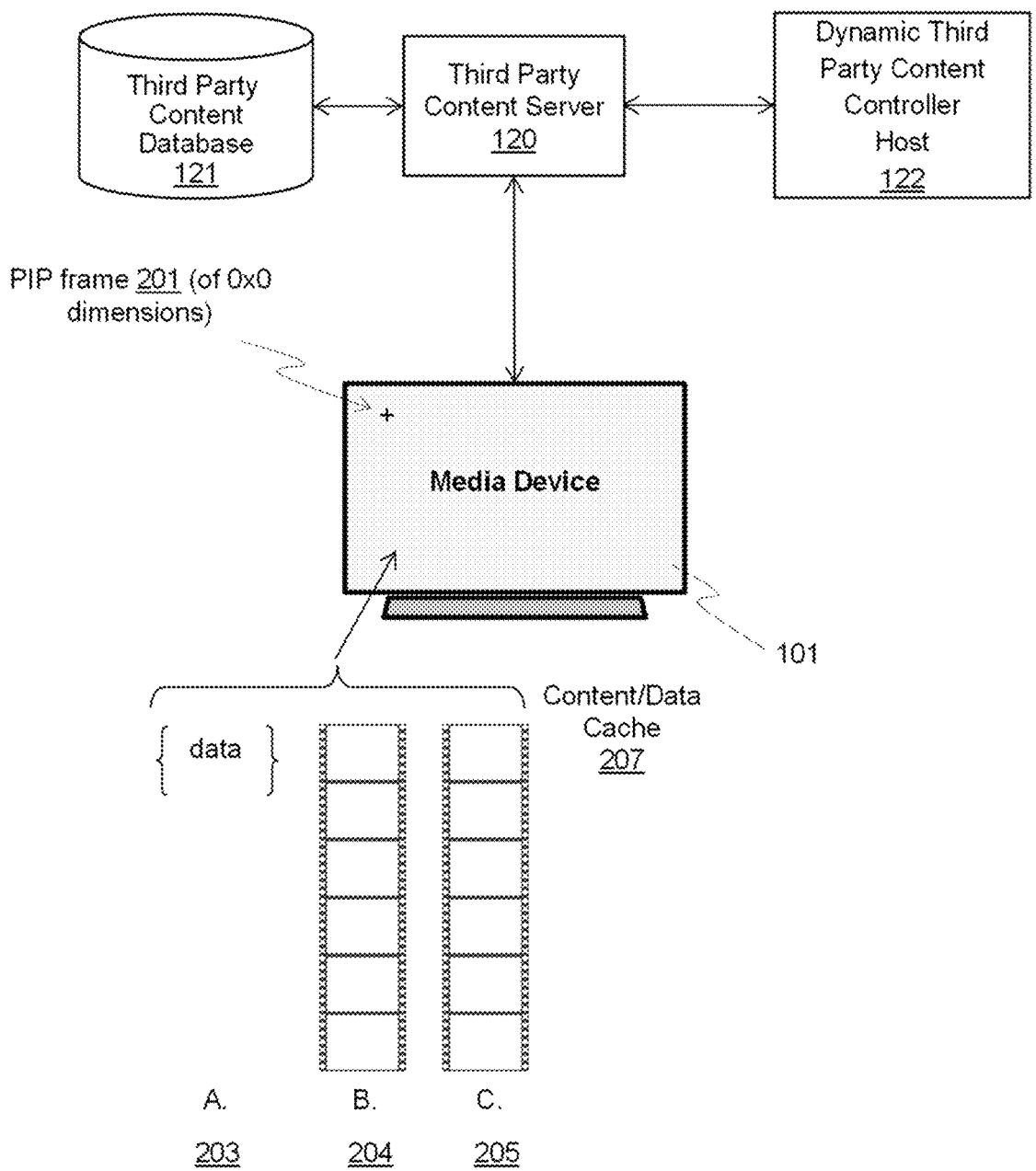
FIG. 2 is a diagram illustrating an example of a media device configuring a Picture-in-Picture (PIP) frame with a dimension of zero-by-zero (0×0) pixels, in accordance with some examples.
Figure 3:
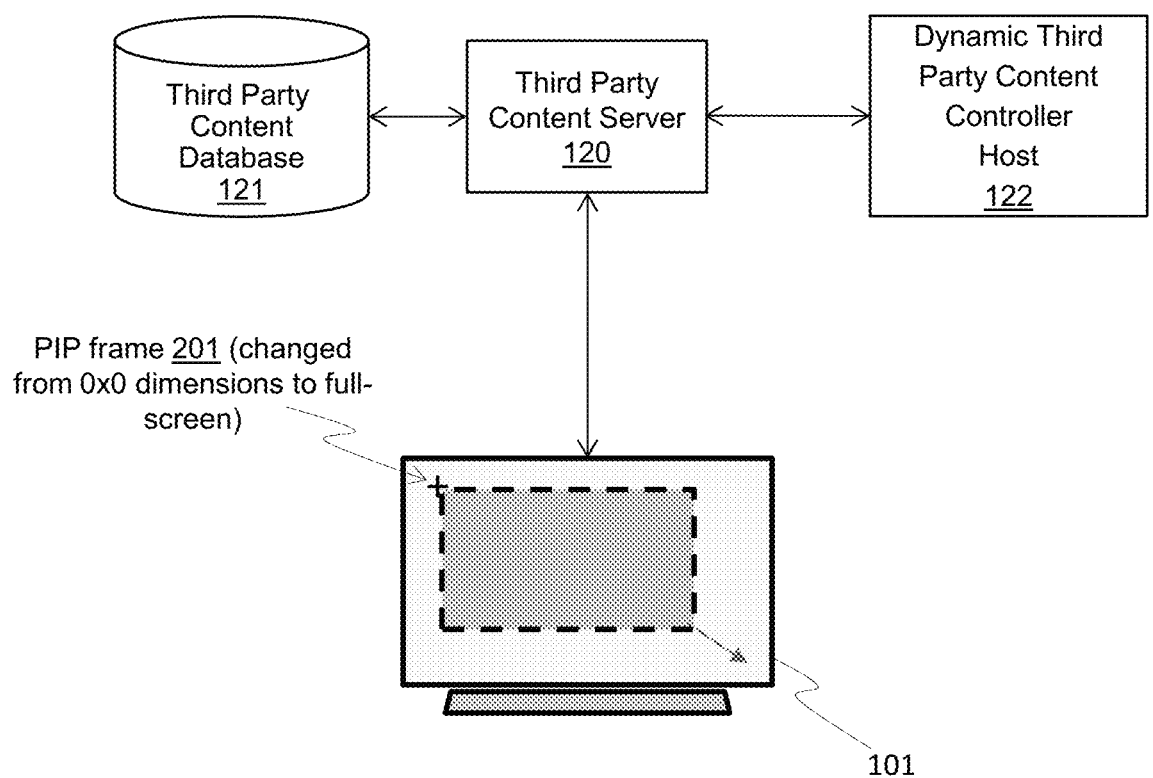
FIG. 3 is a diagram illustrating an example of expansion of the PIP frame in response to a watermark trigger, in accordance with some examples.
Figure 4:
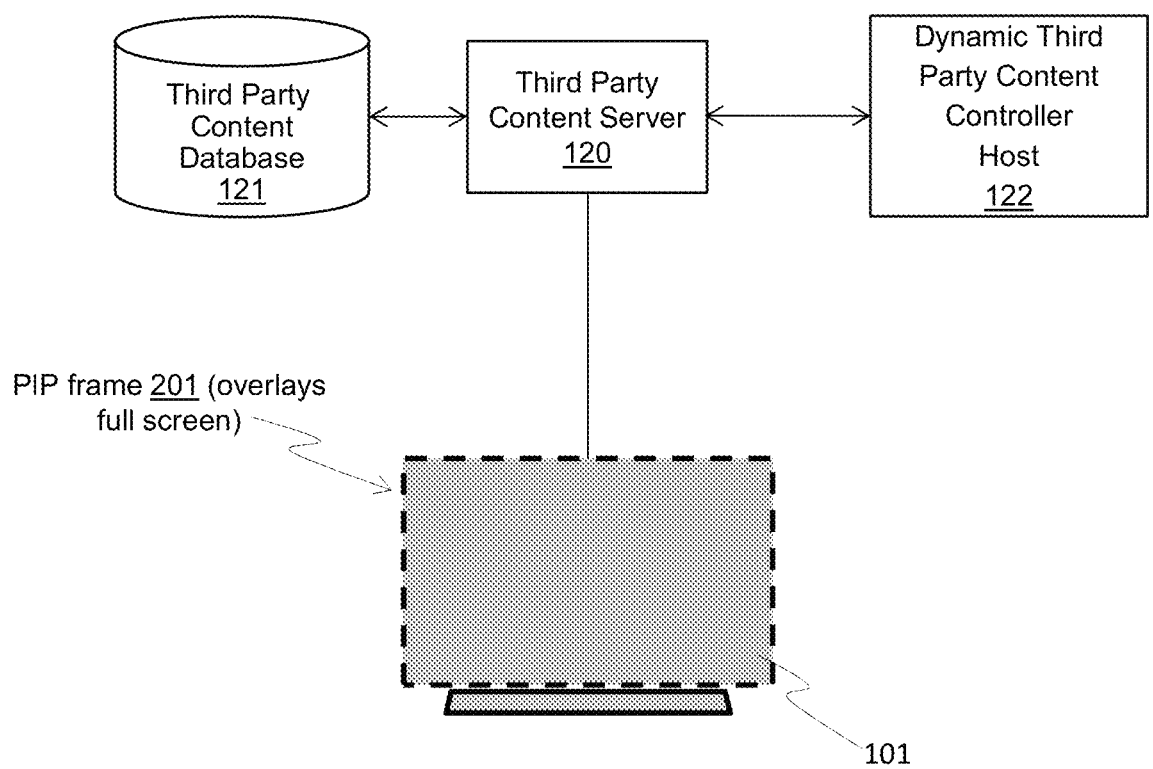
FIG. 4 is a diagram illustrating an example of expansion of the PIP frame to cover a full screen of a display, in accordance with some examples.
Figure 5:
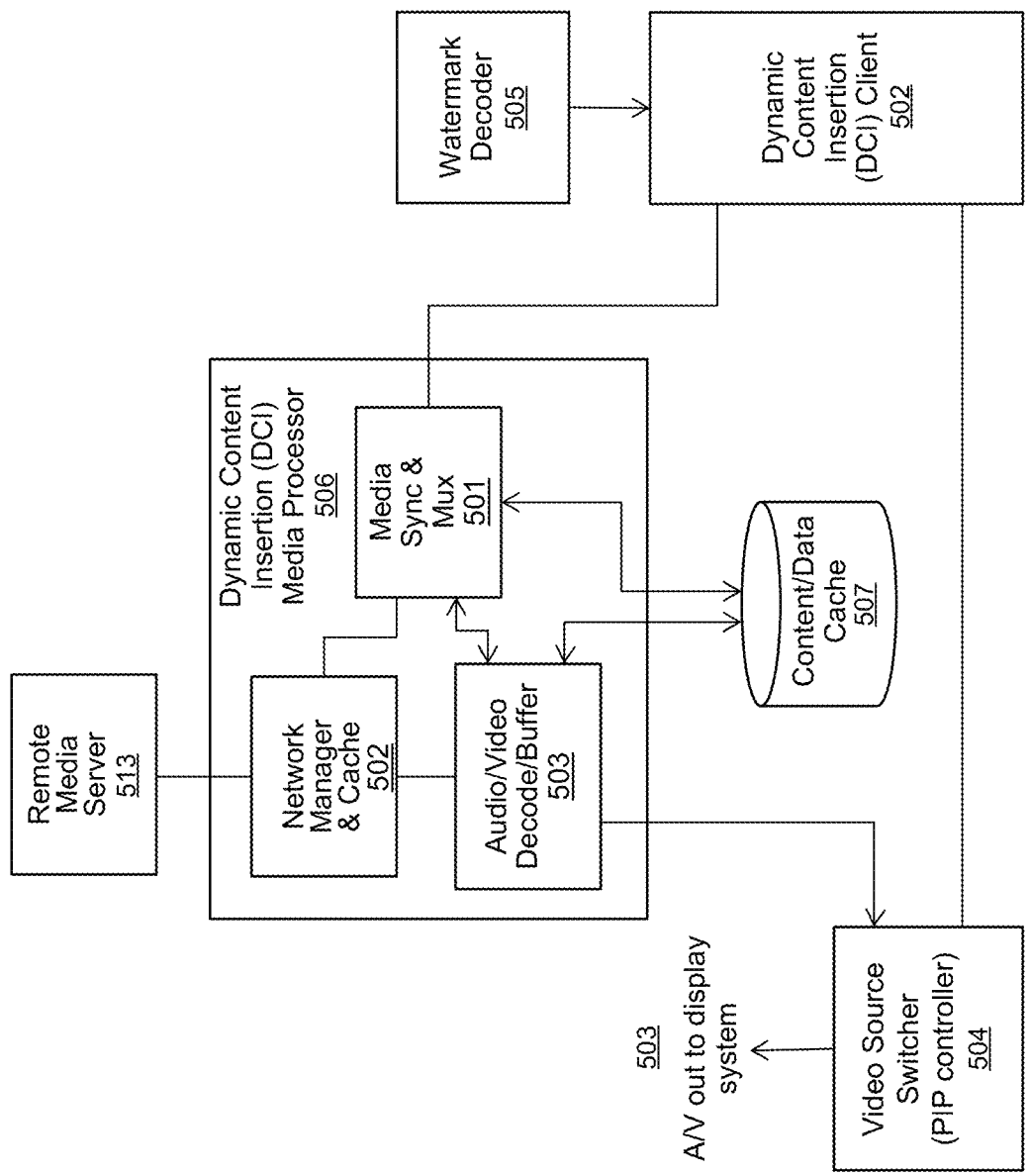
FIG. 5 is a block diagram illustrating an example of an audio/video network access, caching, and switching subsystem, in accordance with some examples.

FIG. 2, FIG. 3, and FIG. 4 illustrate an example of using a PIP video path to display third party content. As shown in FIG. 2, a PIP frame 201 is established with a dimension of zero-by-zero so that the PIP frame 201 is not visible and so that a primary video picture can be displayed in full screen mode. The DCI client 102 or the DCI media processor 106 can determine a third party content item (from candidate third party content items 203, 204, and 205 stored in content/data cache 207) to be substituted at a particular watermark trigger time (or other trigger), and can cue the substitute third party content item to play in the PIP window at the point in a media stream where a watermark trigger is detected (or other trigger). In some cases, part of the cueing process of preparing the third party content item to be displayed in the PIP window is to decode the media of the third party content item (e.g., a partial media segment representing a first portion of the third party content item or the entire third party content item) into uncompressed video (and in some cases audio frames), such as using an audio-video decoder 503 (which, in some cases, includes a buffer) shown in FIG. 5, and provide the decoded third party content item to the video source switcher (PIP controller) 104 of the media system 101. This coding in advance of play-out reduces the delay in displaying third party content items and thus reduces latency from when watermark triggers are detected and when the third party content items are displayed. As shown in FIG. 3, the video source switcher (PIP controller) 104 begins to expand the PIP frame in response to detection of a watermark trigger. As shown in FIG. 4, the PIP frame is expanded until it covers a full screen of a display, at which point the PIP frame fully replaces the underlying video content that was originally scheduled to be displayed.

In some examples, stored third party content items in the content/data cache 107 (or other storage) can be synchronized with the media content 108 by the DCI media processor 106 or the DCI client 102. As noted above, the stored third party content items can include partial media segments including first portions of various third party content items, with remaining portions of the third party content items being provided by third party content server 120 upon request by the DCI media processor 106 or the DCI client 102 (e.g., in response to detecting a watermark in the media content 108). To synchronize a third party content items with the media content 108, the DCI media processor 106 or the DCI client 102 can decode the third party content item into uncompressed video (and in some cases uncompressed audio) and can place the decoded data in an audio-video buffer (e.g., the buffer of the audio-video decoder 503 shown in FIG. 5) in a proper output order so that the third party content item is to be played out in a frame accurate manner to the video processor and display 103. The output order of a video is the order in which the video frames of a video are played out, where a decode order of the video is an order in which the video frames are decoded. The output order can be different than the decode order. The output order is important to keep consistent so that the video is played out correctly without any visual artifacts.

In some examples, to provide an uninterrupted play out of a substitute third party content item, the DCI media processor 106 or the DCI client 102 can encode the third party content item so that it is in a video format (e.g., according to MPEG2, H.264, H.265, or other video specification) or other media format used by the media system 101. For example, the program stream containing the received third party content item from the third party content server 120 can be encoded such that the resulting third party content item is made up of the remainder of the stored third party content item (a partial media segment of the third party content item, such as 200 msec, stored in content/data cache 107) followed by the remainder of the third party content item remotely accessed from the third party content server 120 to form a valid program stream in the media format used by the media system 101.

In some cases, as noted above, an entire item of third party content (e.g., an entire advertisement, an entire substitute movie, or other item of third party content) can be stored locally in the media system 101 (e.g., in the content/data cache 107 or other storage). In one illustrative example, a substitute third party content item can be stored in unused random access memory (RAM). In another illustrative example, in another embodiment, a substitute third party content item can be stored in flash memory and/or other semi-permanent storage of the media system 101.

User viewing patterns can follow a Parrado curve, also known as the 80/20 law, meaning that 80% of the households will be turned to the same ten television channels and, hence, DCI clients in different media devices may be requesting the same block of substitute third party content items throughout various dayparts and especially during primetime viewing times. In some cases, certain likely substitution third party content items can be stored (e.g., cached or otherwise stored) in higher performance storage of the media system 101, such as in the content/data cache 107.

Figure 9:
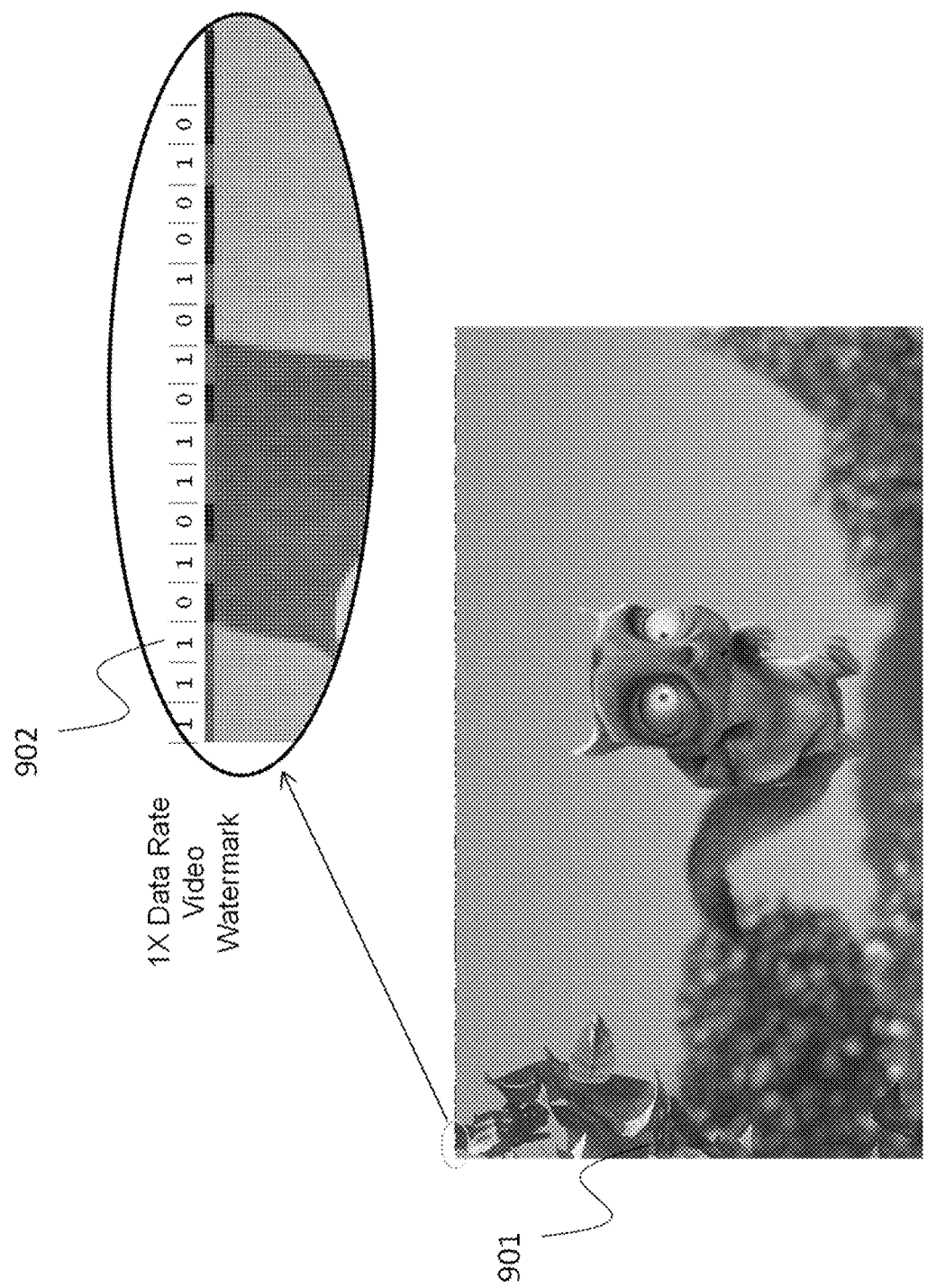
FIG. 9 is a graphic from the ATSC Video Watermark Standard document A/335 showing a video watermark that can be embedded in a video signal to trigger an event, in accordance with some examples.
Figure 10:
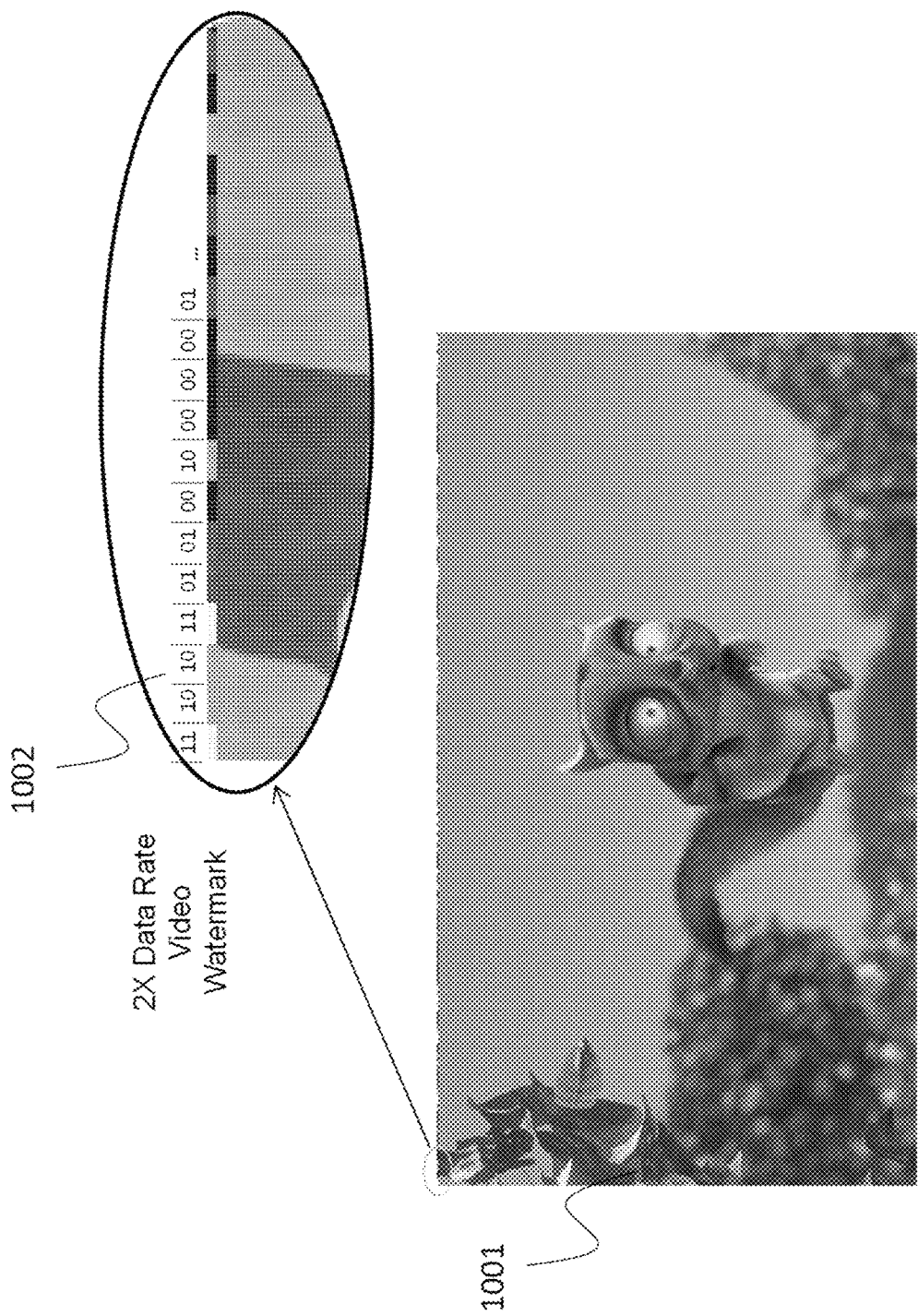
FIG. 10 is a diagram illustrating an example of the ATSC A/335 watermark using four levels of grey providing two-bits per symbol, in accordance with some examples.

As noted above, a watermark can be used to trigger insertion of a third party content item. The watermark decoder 105 can detect watermark data (also referred to as a watermark trigger) in the media content 108 (e.g., in a frame of video provided in a channel of television programming). In some cases, the watermark decoder 105 can implement one or more software applications that are programmed to detect a watermark in one or more video frames of a program of the media content 108 currently being displayed. An example of the structure of a video watermark is described in the Advanced Television Standards Committer (ATSC) A/335 Video Watermarking Standard. FIG. 9 illustrates an example of a single-data-rate (1×) data signal 902 embedded in the top two lines of a video frame 901. The A/335 standard also accommodates a double-data-rate (2×) 1002 encoding system, as illustrated in FIG. 10. The media system 101 may employ a variation of the ATSC A/335 standard by, for example, encoding data on the chroma channel instead of the luminance channel as recommended by A/335. Decoding of the watermark data on the chroma channel can be performed similarly as when the watermark data is encoded on the luma channel.

Upon detection of a watermark in the media content 108, the DCI media processor 106 can retrieve a third party content item from the content/data cache 107 (or other storage), which can be displayed in place of an original third party content item. In some cases, if only a partial media segment of a third party content item (e.g., corresponding to the first few seconds or other time period of the third party content item) is stored in the content/data cache 107 (or other storage), the watermark may contain an address (e.g., a uniform resource locator (URL)), which the media system 101 can b use to fetch the remainder of the third party content item from the third party content server 120. The DCI media processor 106 or DCI client 102 can instruct the video source switcher 104 to switch (e.g., via a media synchronization and multiplexer 501) to the third party content item stored in internal content/data cache 107. In response to detection of the watermark and switching to the third party content item, the video source switcher (PIP controller) 104 expands the existing PIP window (that has been maintained at a dimension of 0×) to full-screen, causing the PIP window to overlay the original video segment, as shown in FIG. 3 and FIG. 4, and the substitution third party content item to start playing in the PIP window without a visually perceptual delay. As noted above, other additional processes can be performed prior to playout of the substitute third party content item, such as decoding the compressed video stream in advance and then providing the third party content item to the video source switcher (PIP controller) 104 for display in the PIP window.

At the end of the third party content item (e.g., 30 seconds later), the video source switcher 104 can be instructed by the DCI media processor 106 or the DCI client 102 to switch back to the original program video. In some cases, if the media system 101 is instructed to switch media content (e.g., switch television channels), for example based on user input, during the period during which a substitute third party content item is being displayed, the overlay video (e.g., the PIP window) can be removed and the original program video can be displayed. In some cases, control logic can be provided in the DCI media processor 106 or the DCI client 102, which can cause the DCI media processor 106 or the DCI client 102 to stop displaying the substitute third party content item and switch back to the original programming when a channel change is detected. The control logic can also be used to serve third party content items and/or other information to devices (referred to as "second-screen" devices) that are on a same network (e.g., a wired or wireless local area network) as the media system 101. For example, third party content items sent by the media system 101 to second-screen devices can mirror the third party content item currently being displayed by the media system 101 or can be a related item of third party content and/or can include additional information about the third party content item being displaying (e.g., an opportunity to purchase a product presented in the third party content item).

In some examples, as an alternative to detecting a watermark, an upcoming media segment substitution (e.g., an advertisement break) can be determined by monitoring a television channel (or other media) that is upstream of the MVPD distribution to homes. Such monitoring can provide one, two, three, or more seconds of advanced detection of a video segment of interest, which is enough time to send a command to the appropriate media system (e.g., media system 101) to replace media content with a substitute third party content item. For example, a command from a network controller of an MVPD distribution system to the media system 101 can be expressed in plain English as "In 3.4 seconds, replace the third party content item on channel 4 with third party content number 11 in your local cache," which can be performed by the media system 101 based on the media system 101 previously fetching and storing the replacement third party content item (with number 11) in the content/data cache 107 or other storage.

In some cases, the system 100 can produce additional helpful information to determine media system actions, such as knowledge of how long a media system has been continuously tuned to current media content (e.g., a current television channel), the type of program currently being viewed, prior viewing habits of devices or users in a same home as the media system 101 (e.g., by day and by daypart), user level behavioral characteristics collected by the system 100, any combination thereof, and/or other information. This information can enable the system 100 to react more responsively to a user's viewing habits and to support a multiple-screen environment that many viewers may utilize.

Figure 8:
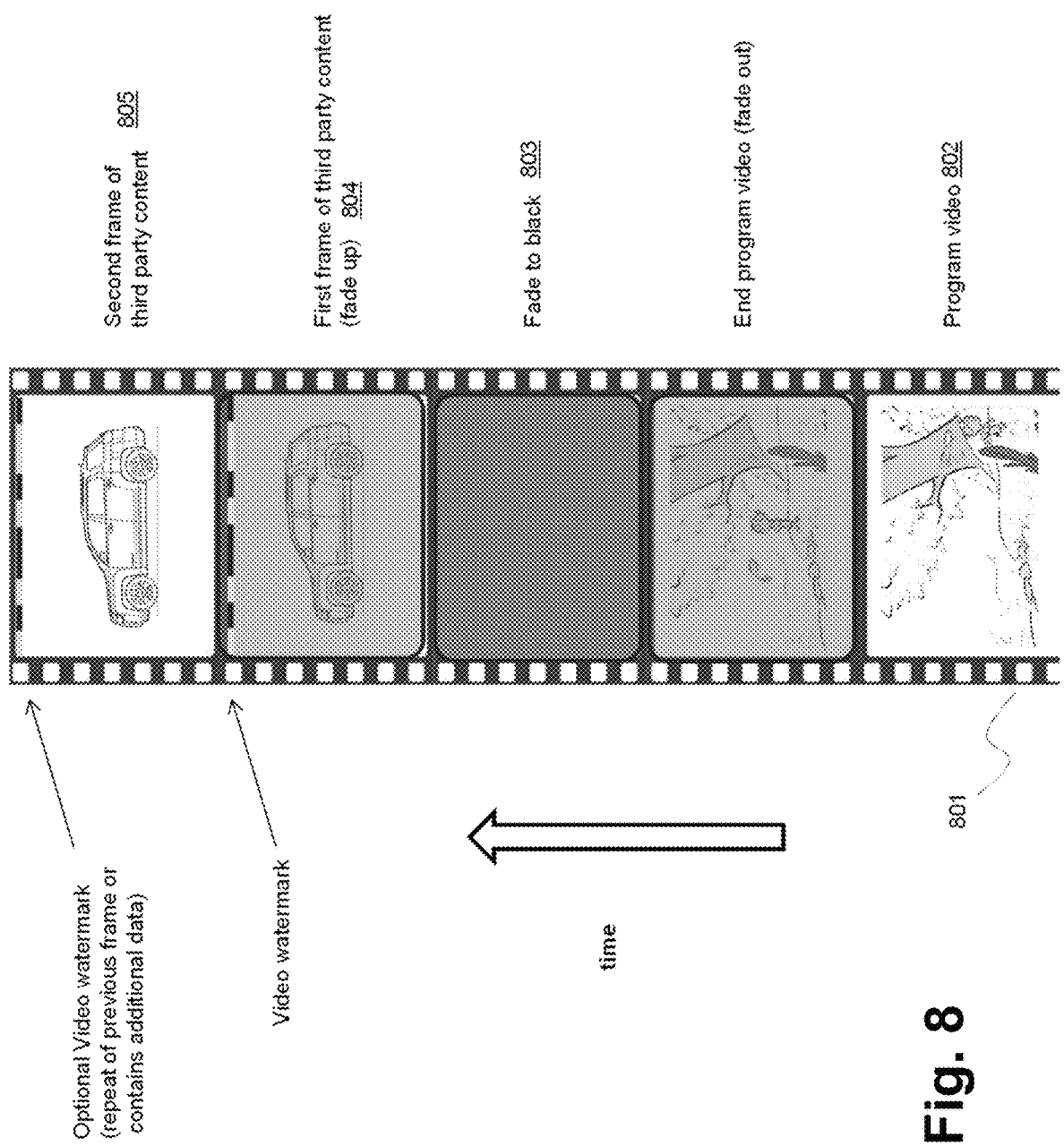
FIG. 8 is a diagram illustrating a transition from an original video being displayed on a media device to a first frame of a substitute third party content item, in accordance with some examples.

An example of video frames 801 can be seen in FIG. 8, which illustrates a transition from an original video being displayed to a first frame 804 of an inserted third party content item that may contain a watermark to enable additional information related to the message be played. As shown, the current program 802 fades to black at frame 803 for display of a third party content item (e.g., an advertisement between segments of a television program), where the first frame 804 of the third party content item includes a video watermark embedded in the frame 804 (e.g., embedded in the top two lines of the video information of the frame 804, as shown in FIG. 9 and FIG. 10). Per ATSC A/335 Video Watermarking standard, these two watermark signals should not be visible to the viewer if the television display system utilizes display overscan, otherwise the A/335 watermark may be visible to the viewer. In some examples, a second, third, or more watermarks can be included in subsequent frames following the frame 804. For example, multiple watermarks can be included in the video frames for redundancy in the event the third party content item was started slightly late by the content provider (e.g., a television broadcaster) origination system and might be missing the first few frames. In another example, multiple watermarks can be used to carry additional information, such as on-screen product information or ordering available on request of the user via the remote control. When such additional information is available, the user can be notified by an on-screen overlay instructing the user to press a certain button on their remote control to display the additional information.

In some examples, the system 100 can attempt to anticipate third party content item substitution opportunities based on a location of the media system 101, based on a current daypart (e.g., morning, afternoon, primetime, late night, among others), based on the channel and/or program stream that the media system 101 is currently displaying, any combination thereof, and/or other factors.

Figure 6:
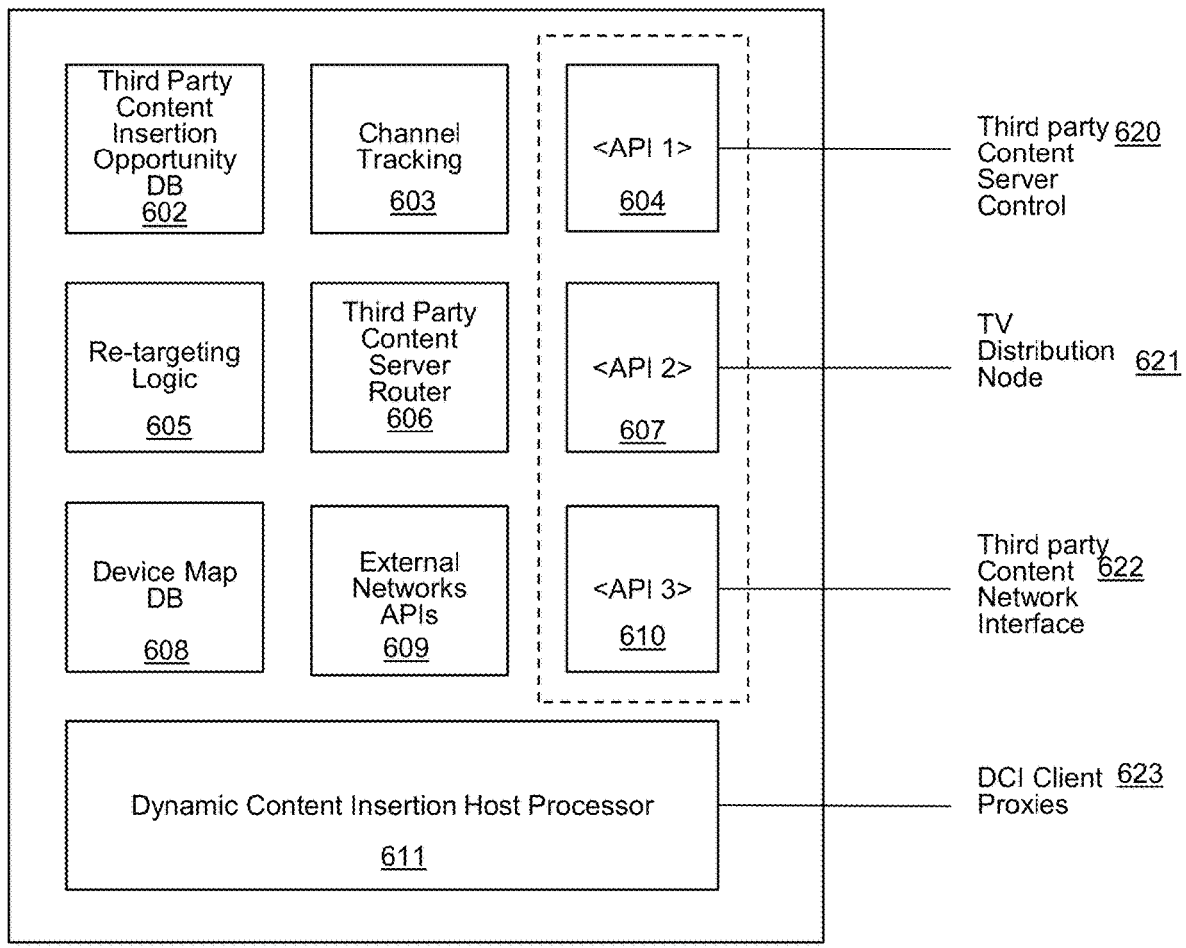
FIG. 6 is a diagram illustrating various components of a dynamic content serving system host, in accordance with some examples.

As noted above, the media system 101 can configure a PIP frame with a dimension of zero-by-zero (0×0) pixels in preparation for display of a third party content item in the PIP window, which is illustrated in FIG. 2, FIG. 3, and FIG. 4. In some cases, the DCI client 102 can manage the dynamic content insertion operations described herein. For example, the DCI client 102 can manage the process of dynamic content insertion described herein. FIG. 6 shows various possible components of the DCI client 102. For example, the DCI client can include a third party content insertion opportunity database 602, a channel tracking engine 603, re-targeting logic 605, a device map database 608, a third party content server router 606, APIs 609 for external networks, a dynamic content insertion host processor 611 (which can be similar to the DCI media processors 106 and/or 506) in communication with DCI client proxies 623, a first API 604, a second API 607, and a third API 610. The first API 604 can be for a third party content server controller 620. The second API 607 can be for a television distribution node 621. The third API 610 can be for a third party content network interface 622.

One illustrative example of a task performed by the DCI client 102 is the scheduling (in combination with the DCI media processor 106) of available dynamic third party content substitution events for every TV channel participating in the DCI. The DCI client 102 can accommodate any number of service providers offering dynamic third party content (e.g., dynamic advertisement media). In some cases, the dynamic advertising market will utilize common content standards such as the Interactive Advertising Bureau (IAB) promoted identification protocols called the Video Ad Serving Template (VAST). Even for those dynamic ad providers with proprietary protocols and metadata, the system can still accommodate all providers. In some cases, it can be assumed that the dynamic advertising market for television programming will adopt industry standards such as the ATSC Video Watermark as specified in document A/335. Proprietary protocols can be managed for those providers not conforming to any particular standard.

As described above, the techniques described herein provide an optimal platform for the most efficient deployment of a dynamic third party content insertion system. The requirement for low latency and rapid switching of the video signals needed to perform a visually acceptable dynamic third party content insertion system has been met by combining the use of a PIP video channel with optional local processing of the third party content. Such systems and techniques can maintain an optimally responsive service with third party content substitution and/or redirection performed in a timely and unobtrusive manner.

As noted above, FIG. 5 is a block diagram illustrating an example of an audio/video network access, caching, and switching sub-system. As shown, the sub-system of FIG. 5 includes various components, including a remote media server 513, a video source switcher 504 (also referred to as a PIP controller), a watermark decoder 505, a DCI client 502, a dynamic content insertion (DCI) media processor 506, and a content/data cache 507. The DCI media processor 506 includes a media and synchronization multiplexer 501 that can perform one or more of the synchronization techniques described herein. The DCI media processor 506 further includes a network manager and cache engine 502 that can manage communications with the remote media server 513 and storage of media content received from the remote media server 513. The DCI media processor 506 also includes an audio-video decoder 503, which can in some cases include a buffer or other storage. The system shown in FIG. 5 can be part of the media system 101 in some examples. The components in FIG. 5 can perform similar operations and/or functions as like components in FIG. 1. For example, the DCI media processor 506 can, in some cases, perform similar operations as those performed by the DCI media processor 106 of the media system 101 shown in FIG. 1.

Figure 7:
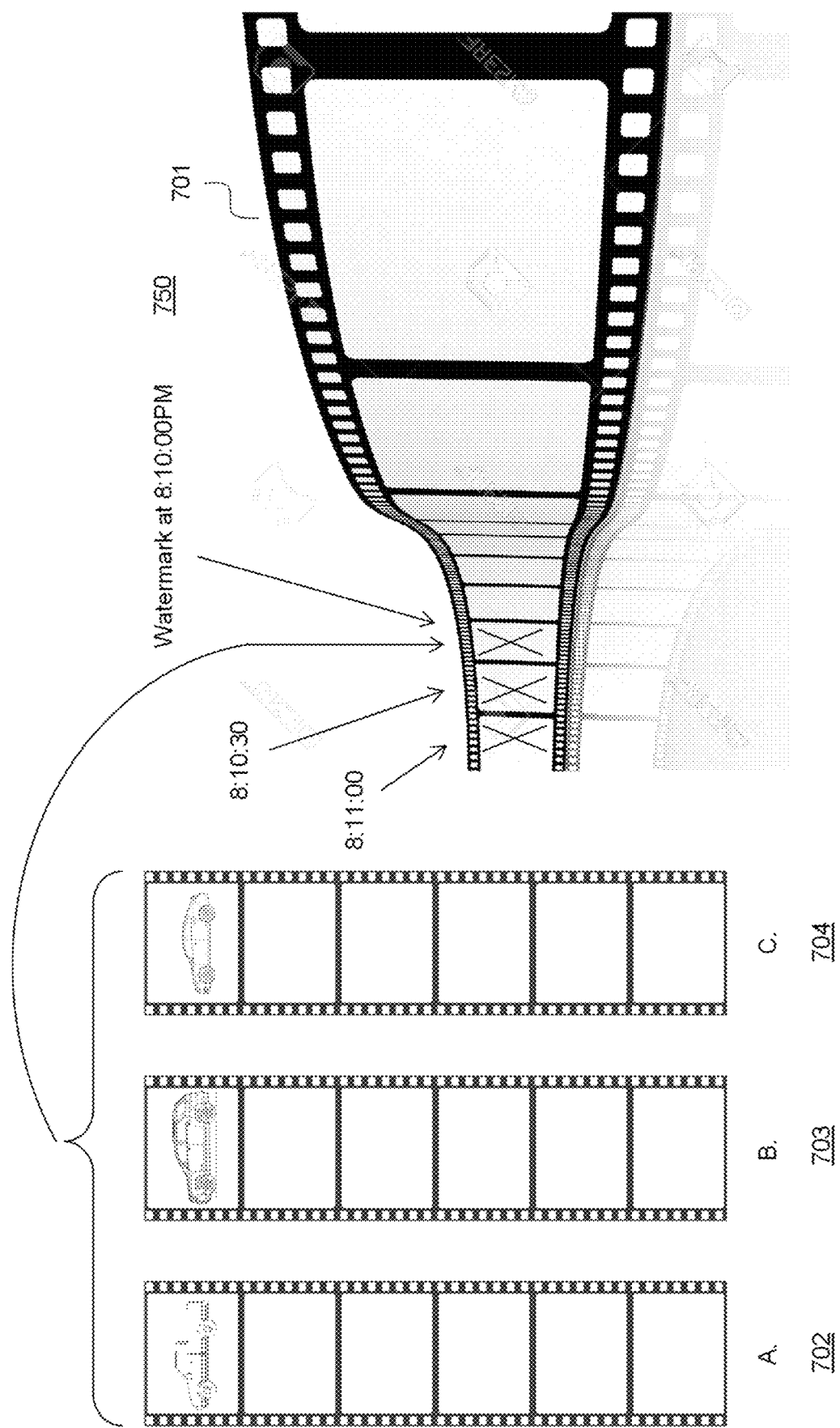
FIG. 7 is a diagram illustrating three prospective third party content items (labeled A, B, C) that are associated with one third party content time slot, in accordance with some examples.

FIG. 7 is a diagram illustrating three prospective items of third party content (shown as A, B, and C) that are associated with one available time slot 750. One of the items of third party content A, B, or C is to be chosen for insertion in slot 750, for example based on certain demographic information or other qualifying factor such as zip code.

Figure 11:
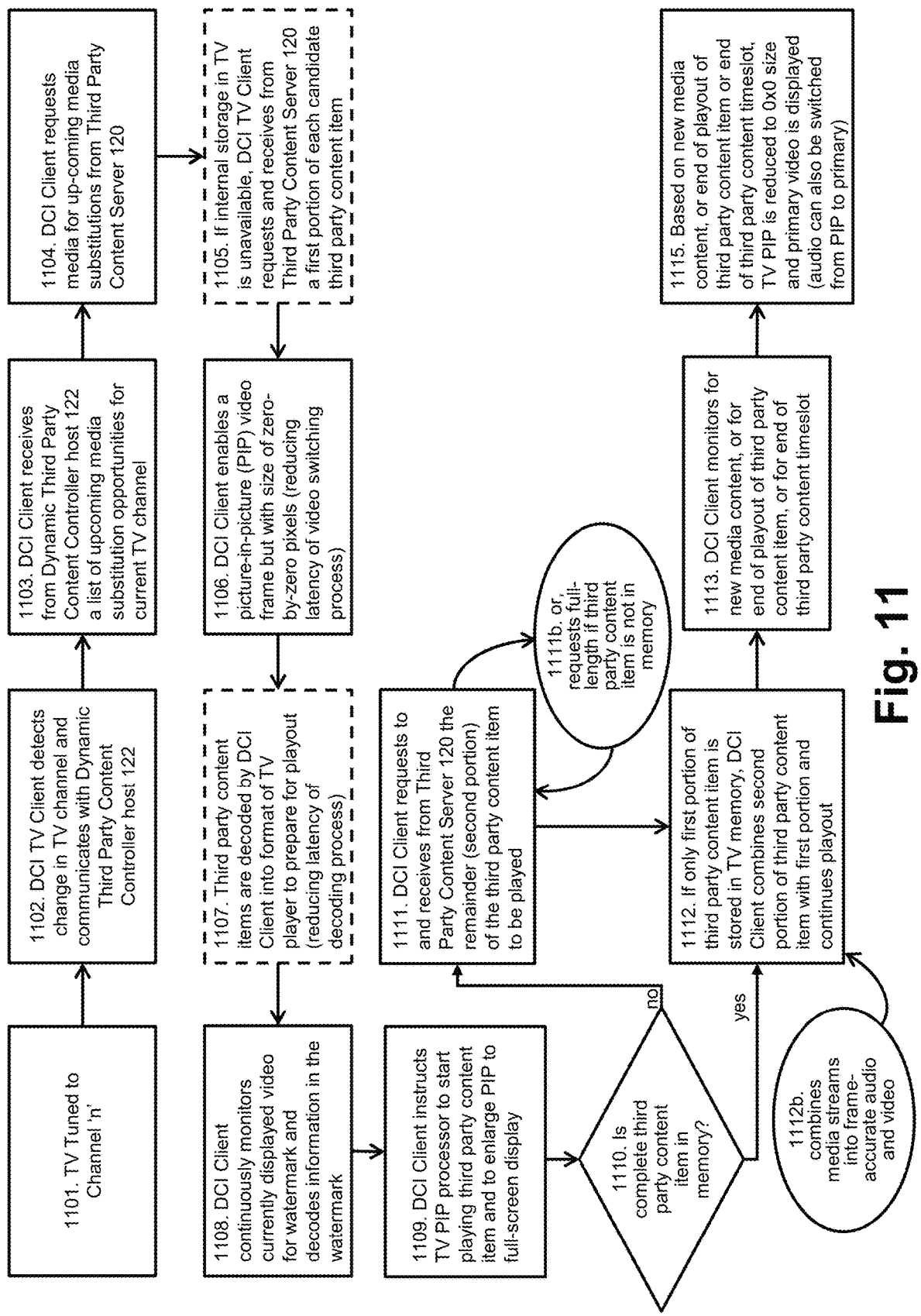
FIG. 11 is a flow chart depicting an example of a process for substituting a media segment using a picture-in-picture (PIP) frame, in accordance with some examples.

FIG. 11 is a flow chart illustrating an example of a media segment substitution process using the techniques described herein. The process shown in FIG. 11 is described using a television (TV) as an example of the media system 101. However, the process shown in FIG. 11 can be performed using any type of media system or media device. At operation 1101, the process includes determining the TV is Tuned to a particular channel (denoted as Channel 'n'). At operation 1102, the process includes detecting (e.g., by the DCI client 102 or the DCI media processor 106) a change in the TV channel and communicating with the dynamic third party content controller host 122, which can put the third party content server 120 in communication with the DCI client 102. At operation 1103, the process includes receiving (e.g., by the DCI client 102 or the DCI media processor 106) from the dynamic third party content controller host 122 or from the third party content server 120 a list of upcoming media substitution opportunities (e.g., a list of third party content items) for the current TV channel.

At operation 1104, the process includes requesting (e.g., by the DCI client 102 or the DCI media processor 106) media for upcoming media substitutions from the third party content server 120. For example, the process can request third party content items for the upcoming media substitutions. At an optional operation 1105 (the optionality of operation 1105 is illustrated using the dashed outline of the box), the process includes, if the internal storage of the TV is unavailable or insufficient to store full third party content items, requesting and receiving from the third party content server 120 partial media segments of the candidate third party content item. As noted above, the partial media segments can include a first portion of each candidate third party content item.

At operation 1106, the process includes enabling (e.g., by the DCI client 102 or the DCI media processor 106) a picture-in-picture (PIP) video frame with size of zero-by-zero pixels (as illustrated in FIG. 2). As described above, by pre-configuring the PIP video frame before a third party content item is displayed in the PIP window, latency of the video switching process is reduced when the third party content item is to be displayed. At an optional operation 1107 (illustrated using the dashed outline of the box), third party content items are decoded into a format used by the TV to prepare for playout of the third party content item, which reduces latency caused by the decoding process when the third party content item is to be played out.

At operation 1108, the process includes monitoring (e.g., continuously monitoring or periodically monitoring) currently the displayed video for a watermark and decoding information in the watermark when a watermark is detected. At operation 1109, in response to detecting a watermark, the process includes instructing (e.g., by the DCI client 102 or the DCI media processor 106) the TV PIP processor (e.g., video source switcher (PIP controller) 104) to start playing the third party content item and to enlarge the PIP to full-screen display (as illustrated in FIG. 3 and FIG. 4).

At operation 1110, the process determines whether a complete third party content item is in local memory (e.g., content/data cache 107). At operation 1111, the process includes sending (e.g., by the DCI client 102 or the DCI media processor 106) a request to the third party content server 120 for the remainder (second portion) of the third party content item to be played, and receiving the second portion of the third party content item. At operation 1111b, the process includes requesting the full length third party content item when a partial media segment of the third party content item is not stored in the local memory.

At operation 1112, if the partial media segment (including the first portion) of the third party content item is stored in the local memory, the process includes combining (e.g., by the DCI client 102 or the DCI media processor 106) the second portion of the third party content item with the first portion (in the partial media segment), and continuing the playout of the third party content item. At operation 1112b, the process combines media streams into frame accurate video (and audio in some cases), as described above.

At operation 1113, the process includes monitoring (e.g., by the DCI client 102 or the DCI media processor 106) for new media content, for the end of playout of the third party content item, or for the end of a third party content timeslot. At operation 1115, based on the detection new media content, detection of the end of playout of the third party content item, or detection of the end of the third party content timeslot, the PIP window is reduced back down to the 0×0 size and the primary video content is displayed (in some cases audio can also be switched from PIP to primary).

Figure 12:
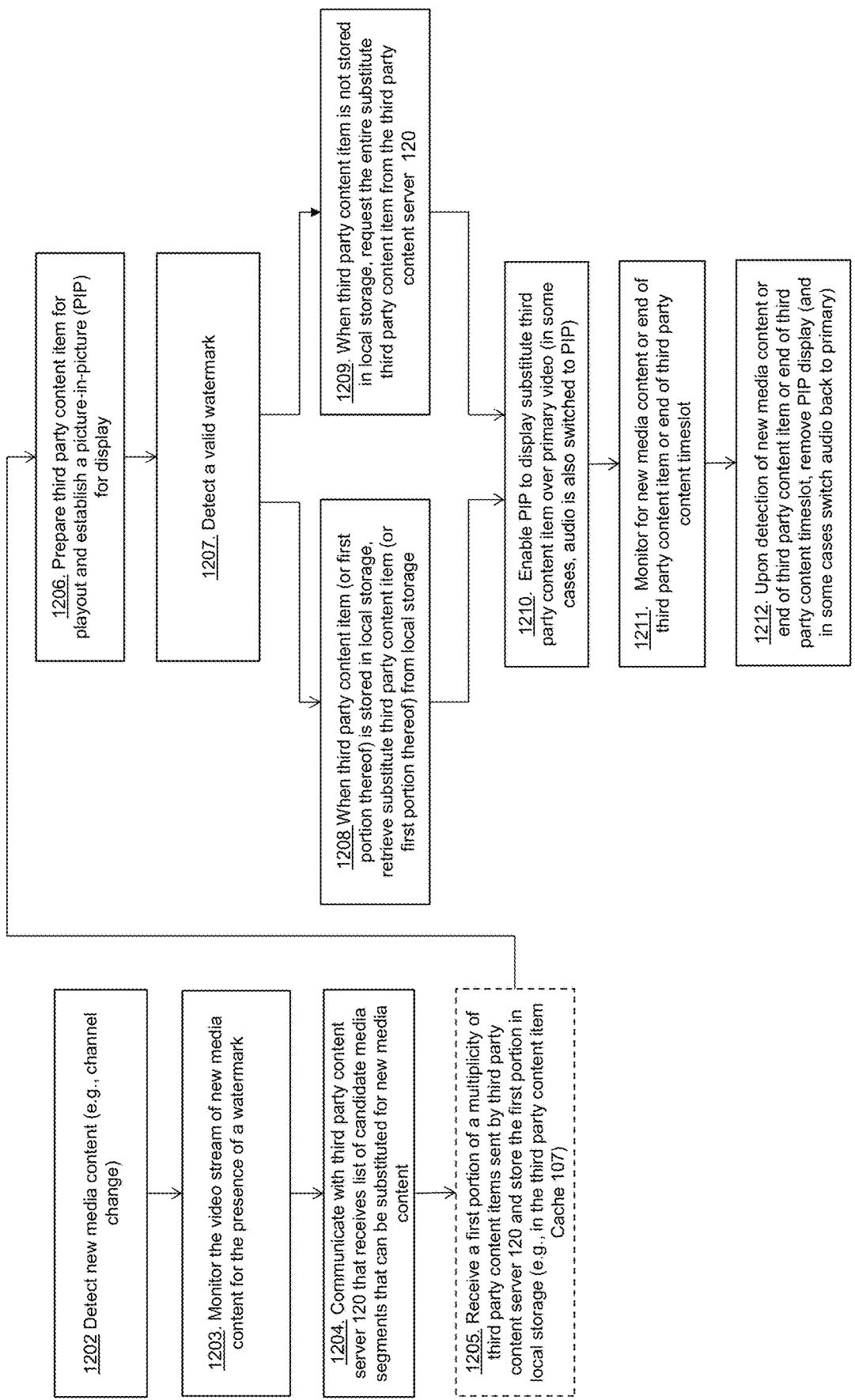
FIG. 12 is a flow chart depicting another example of a process for substituting a media segment using a picture-in-picture (PIP) frame, in accordance with some examples.

FIG. 12 is a flow chart illustrating another example of a media segment substitution process using the techniques described herein. The process shown in FIG. 12 can be performed by the by the DCI client 102 and/or by the DCI media processor 106, and/or by any other component of the media system 101. At operation 1202, the process includes detecting new media content (e.g., a channel change, a change from one movie to another movie, or other change in media content). At operation 1203, the process includes monitoring the video stream of the new media content for the presence of a watermark. In some examples, as described above, the media system 101 can have prior knowledge of television channels containing third party content items and can only monitor television channels that contain third party content item substation opportunities (e.g., DCI enabled content that allows substitution of one third party content item for one or more other third party content items). At operation 1204, the process includes communicating with the third party content server 120 that receives list of candidate media segments that can be substituted for new media content. In some examples, eligible third party content items for the same time slot on multiple channels can be provided to the television for use in the event a user switches channels.

At operation 1205, the process includes receiving a first portion (e.g., partial media segments) of a multiplicity of third party content items sent by third party content server 120 and storing the first portion in local storage (e.g., in the third party content item Cache 107). As noted above, the first portion can include a certain time period of the third party content items (e.g., the first 200 msec of the third party content items).

At operation 1206, the process includes preparing the third party content item for playout and establishing a picture-in-picture (PIP) frame for display (e.g., with a dimension of 0×0).

At operation 1207, the process includes detecting a valid watermark. At operation 1208, when a substitute third party content item (or first portion thereof) is stored in local storage, the process includes retrieving a substitute third party content item (or first portion thereof) from local storage. At operation 1209, when the substitute third party content item is not stored in local storage, the process includes requesting the entire substitute third party content item from the third party content server 120.

At operation 1210, the process includes enabling the PIP to display the substitute third party content item over the primary video (in some cases, audio is also switched to PIP). At operation 1211, the process includes monitoring for new media content, for the end of third party content item, or for the end of third party content timeslot. At operation 1212, upon detection of new media content, the end of third party content item, or the end of third party content timeslot, the process includes removing the PIP window from display (and in some cases switching audio back to primary).

FIG. 13 is a flow chart illustrating an example of a process 1300 for performing content substitution. At operation 1302, the process 1300 includes determining, by a computing device, candidate portions of a video channel for content substitution. At operation 1304, the process 1300 includes configuring a picture-in-picture window for display of one or more substitute video segments. The one or more substitute video segments can include one or more third party content items. At operation 1306, the process 1300 includes identifying watermark data in a video frame of the video channel, the watermark data indicating a presence of a candidate portion of the video channel for content substitution. At operation 1308, the process 1300 includes obtaining at least a portion of a substitute video segment corresponding to the candidate portion of the video channel, wherein the substitute video segment is obtained in response to identifying the watermark data.

In some examples, the process 1300 can include receiving, on the computing device, at least a portion of one or more substitute video segments corresponding to the candidate portions of the video channel, and storing, in storage of the computing device, at least the portion of the one or more substitute video segments. In such examples, the process 1300 can include obtaining, from the storage of the computing device, at least the portion of the substitute video segment corresponding to the candidate portion of the video channel. In some examples, the process 1300 can include obtaining, from a server, at least the portion of the substitute video segment corresponding to the candidate portion of the video channel. In some cases, the process 1300 can include obtaining the entire substitute video segment. In some cases, the process 1300 can include obtaining the portion of (less than the entire) the substitute video segment.

At operation 1310, the process 1300 includes displaying at least the portion of the substitute video segment in the picture-in-picture window. By displaying at least the portion of the substitute video segment, the substitute video segment replaces a video segment included in the video channel with the substitute video segment.

In some examples, at least the portion of the one or more substitute video segments includes partial media segments of the one or more substitute video segments. For instance, the partial media segments of the one or more substitute video segments can include a portion of the one or more substitute video segments. In some examples, at least the portion of the substitute video segment includes a partial media segment of the substitute video segment. For instance, the partial media segment of the substitute video segment can include a portion of the substitute video segment. In such examples, the process 1300 can include requesting a remaining portion of the substitute video segment (the portion of the substitute video segment other than the portion of the video segment), receiving the remaining portion of the substitute video segment, and displaying the remaining portion of the substitute video segment in the picture-in-picture window after at least the portion of the substitute video segment is displayed.

In some examples, the process 1300 can include decoding at least the portion of the substitute video segment and providing the decoded at least the portion of the substitute video segment to a picture-in-picture controller before displaying at least the portion of the substitute video segment in the picture-in-picture window. For instance, as described above, a cueing process can be performed to prepare the third party content item to be displayed in the picture-in-picture window. The cueing process can include decoding the media of the third party content item (e.g., a partial media segment representing a first portion of the third party content item or the entire third party content item) into uncompressed video (and in some cases audio frames), such as using an audio-video decoder 503 shown in FIG. 5. The process can include providing the decoded third party content item to the video source switcher (or PIP controller) 104 of the media system 101.

In some examples, the process 1300 can include synchronizing at least the portion of the substitute video segment with content of the video channel. For instance, as described above, the DCI media processor 106 or the DCI client 102 can decode the third party content item into uncompressed video (and in some cases uncompressed audio) and can place the decoded data in an audio-video buffer (e.g., the buffer of the audio-video decoder 503 shown in FIG. 5) in a particular output order. The third party content item can then be output (or played out) in a frame accurate manner to the video processor and display 103.

In some examples, the process 1300 can include detecting a channel change from the video channel to a different video channel, and stopping display of the substitute video segment in response to detecting the channel change.

Figure 14:
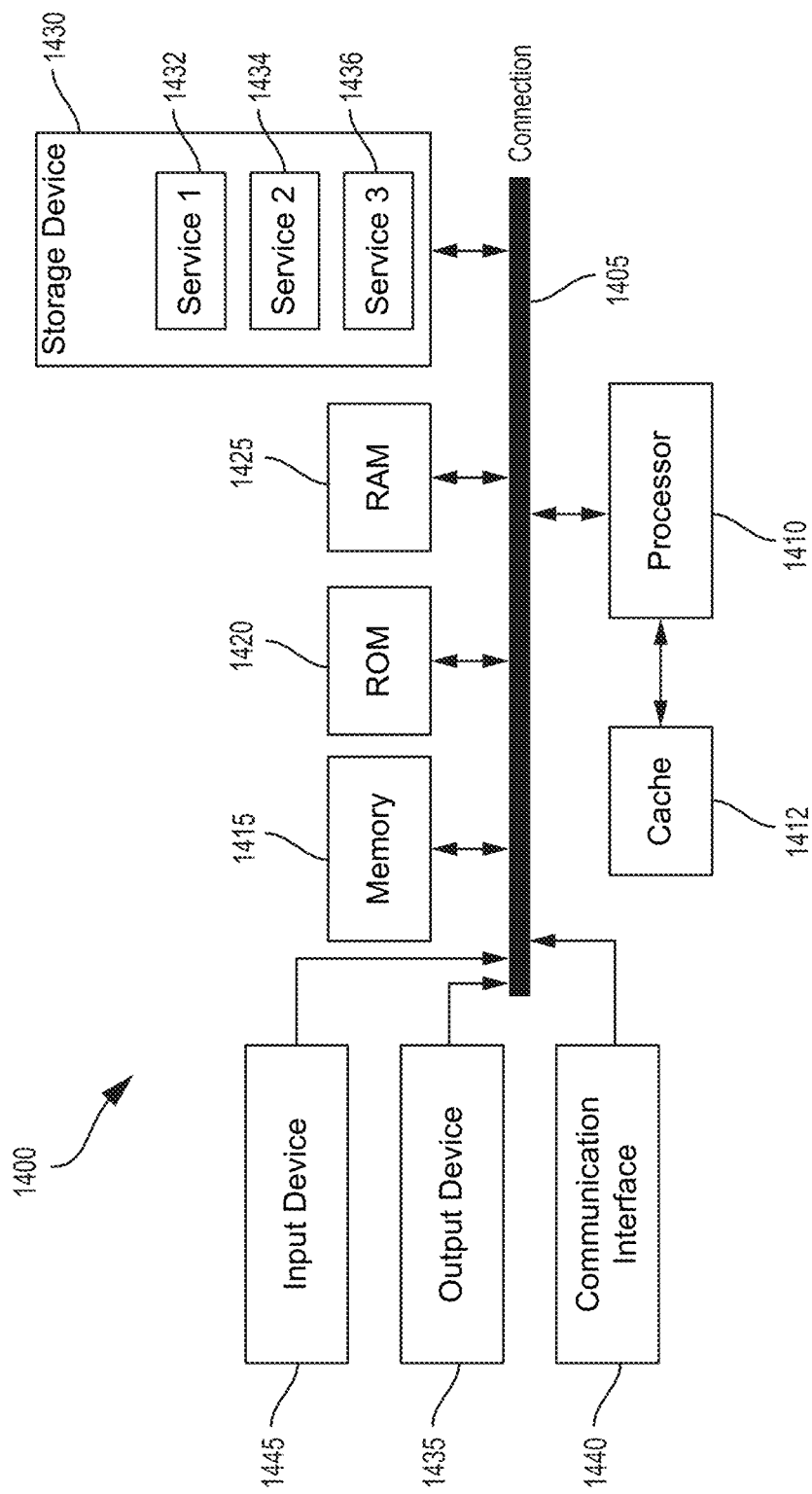
FIG. 14 is an example computing device architecture of an example computing device that can implement the various techniques described herein.

In some examples, the processes described herein (e.g., process 1100, process 1200, process 1300, and/or other process described herein) may be performed by a computing device or apparatus, such as a computing device having the computing device architecture 1400 shown in FIG. 14. In one example, the processes can be performed by a computing device with the computing device architecture 1400 implementing the media system 101. The computing device can include any suitable device, such as a television, a set-top box, a mobile device (e.g., a mobile phone), a wearable device, a server (e.g., in a software as a service (SaaS) system or other server-based system), and/or any other computing device with the resource capabilities to perform the processes described above. In some cases, the computing device or apparatus may include various components, such as an input device, an edge detection engine, an input-to-edge mapping engine, an edge validation engine, a vector drawing generation engine, one or more output devices, one or more processors, one or more microprocessors, one or more microcomputers, and/or other component that is configured to carry out the steps of the processes. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The processes 1100, 1200, and 1300 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1100, 1200, and 1300, and/or any other processes described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 14 illustrates an example computing device architecture 1400 of an example computing device which can implement the various techniques described herein. For example, the computing device architecture 1400 can implement the dynamic content serving system 100 shown in FIG. 1. The components of computing device architecture 1400 are shown in electrical communication with each other using connection 1405, such as a bus. The example computing device architecture 1400 includes a processing unit (CPU or processor) 1410 and computing device connection 1405 that couples various computing device components including computing device memory 1415, such as read only memory (ROM) 1420 and random access memory (RAM) 1425, to processor 1410.

Computing device architecture 1400 can include a cache of high-speed memory connected directly with, in close proximity to, or integrated as part of processor 1410. Computing device architecture 1400 can copy data from memory 1415 and/or the storage device 1430 to cache 1412 for quick access by processor 1410. In this way, the cache can provide a performance boost that avoids processor 1410 delays while waiting for data. These and other modules can control or be configured to control processor 1410 to perform various actions. Other computing device memory 1415 may be available for use as well. Memory 1415 can include multiple different types of memory with different performance characteristics. Processor 1410 can include any general purpose processor and a hardware or software service, such as service 1 1432, service 2 1434, and service 3 1436 stored in storage device 1430, configured to control processor 1410 as well as a special-purpose processor where software instructions are incorporated into the processor design. Processor 1410 may be a self-contained system, containing multiple cores or processors, a bus, memory controller, cache, etc. A multi-core processor may be symmetric or asymmetric.

To enable user interaction with the computing device architecture 1400, input device 1445 can represent any number of input mechanisms, such as a microphone for speech, a touch-sensitive screen for gesture or graphical input, keyboard, mouse, motion input, speech and so forth. Output device 1435 can also be one or more of a number of output mechanisms known to those of skill in the art, such as a display, projector, television, speaker device, etc. In some instances, multimodal computing devices can enable a user to provide multiple types of input to communicate with computing device architecture 1400. Communications interface 1440 can generally govern and manage the user input and computing device output. There is no restriction on operating on any particular hardware arrangement and therefore the basic features here may easily be substituted for improved hardware or firmware arrangements as they are developed.

Storage device 1430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1425, read only memory (ROM) 1420, and hybrids thereof. Storage device 1430 can include services 1432, 1434, 1436 for controlling processor 1410. Other hardware or software modules are contemplated. Storage device 1430 can be connected to the computing device connection 1405. In one aspect, a hardware module that performs a particular function can include the software component stored in a computer-readable medium in connection with the necessary hardware components, such as processor 1410, connection 1405, output device 1435, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A computer-implemented method of performing content substitution, comprising:
   determining, by a computing device, candidate portions of a video channel for content substitution;
   configuring an instance of a picture-in-picture window for display of one or more substitute video segments, wherein the picture-in-picture window is configured to be displayed in a reduced size until watermark data being identified;
   obtaining at least a portion of a substitute video segment, wherein the portion of the substitute video segment is decoded in preparation for identifying watermark data in the video channel, and wherein the portion of the substitute video segment is associated with the picture-in-picture window;
   identifying the watermark data in a video frame of the video channel, the watermark data indicating a presence of a candidate portion of the video channel for content substitution; and
   displaying at least the portion of the substitute video segment in the picture-in-picture window, the substitute video segment replacing a video segment included in the video channel with the substitute video segment.

2. The method of claim 1, further comprising:
receiving, on the computing device, at least a portion of one or more substitute video segments corresponding to the candidate portions of the video channel;
storing, in storage of the computing device, at least the portion of the one or more substitute video segments; and
obtaining, from the storage of the computing device, at least the portion of the substitute video segment corresponding to the candidate portion of the video channel.

3. The method of claim 1, further comprising:
obtaining, from a server, at least the portion of the substitute video segment corresponding to the candidate portion of the video channel.

4. The method of claim 1, wherein the one or more substitute video segments include one or more third party content items.

5. The method of claim 1, wherein at least the portion of the one or more substitute video segments includes partial media segments of the one or more substitute video segments.

6. The method of claim 5, wherein the partial media segments of the one or more substitute video segments include a portion of the one or more substitute video segments.

7. The method of claim 1, wherein at least the portion of the substitute video segment includes a partial media segment of the substitute video segment.

8. The method of claim 7, wherein the partial media segment of the substitute video segment includes a portion of the substitute video segment.

9. The method of claim 8, further comprising:
requesting a remaining portion of the substitute video segment;
receiving the remaining portion of the substitute video segment; and
displaying the remaining portion of the substitute video segment in the picture-in-picture window after at least the portion of the substitute video segment is displayed.

10. The method of claim 1, further comprising:
decoding at least the portion of the substitute video segment; and
providing the decoded at least the portion of the substitute video segment to a picture-in-picture controller before displaying at least the portion of the substitute video segment in the picture-in-picture window.

11. The method of claim 1, further comprising:
synchronizing at least the portion of the substitute video segment with content of the video channel.

12. The method of claim 1, further comprising:
detecting a channel change from the video channel to a different video channel; and
stopping display of the substitute video segment in response to detecting the channel change.

13. An apparatus for performing content substitution, comprising:
a memory configured to store video data; and
a processor coupled to the memory and configured to:
determine candidate portions of a video channel for content substitution;
configure an instance of a picture-in-picture window for display of one or more substitute video segments, wherein the picture-in-picture window is configured to be displayed in a reduced size prior to watermark data being identified;
obtain at least a portion of a substitute video segment, wherein the portion of the substitute video segment is decoded in preparation for identifying watermark data in the video channel, and wherein the portion of the substitute video segment is associated with the picture-in-picture window;
identify the watermark data in a video frame of the video channel, the watermark data indicating a presence of a candidate portion of the video channel for content substitution; and
display at least the portion of the substitute video segment in the picture-in-picture window, the substitute video segment replacing a video segment included in the video channel with the substitute video segment.

14. The apparatus of claim 13, further comprising a storage device, wherein the processor is configured to:
receive at least a portion of one or more substitute video segments corresponding to the candidate portions of the video channel;
store, in the storage device, at least the portion of the one or more substitute video segments; and
obtaining, from the storage device, at least the portion of the substitute video segment corresponding to the candidate portion of the video channel.

15. The apparatus of claim 13, wherein the processor is configured to:
obtain, from a server, at least the portion of the substitute video segment corresponding to the candidate portion of the video channel.

16. The apparatus of claim 13, wherein the one or more substitute video segments include one or more third party content items.

17. The apparatus of claim 13, wherein at least the portion of the one or more substitute video segments includes partial media segments of the one or more substitute video segments, the partial media segments including a portion of the one or more substitute video segments.

18. The apparatus of claim 13, wherein at least the portion of the substitute video segment includes a partial media segment of the substitute video segment, the partial media segment of the substitute video segment including a portion of the substitute video segment, and wherein the processor is configured to:
request a remaining portion of the substitute video segment;
receive the remaining portion of the substitute video segment; and
display the remaining portion of the substitute video segment in the picture-in-picture window after at least the portion of the substitute video segment is displayed.

19. The apparatus of claim 13, further comprising:
decoding at least the portion of the substitute video segment; and
providing the decoded at least the portion of the substitute video segment to a picture-in-picture controller before displaying at least the portion of the substitute video segment in the picture-in-picture window.

20. A non-transitory computer readable medium having stored thereon instructions that, when executed by a processor, cause the processor to:
determine candidate portions of a video channel for content substitution;

configure an instance of a picture-in-picture window for display of one or more substitute video segments, wherein the picture-in-picture window is configured to be displayed in a reduced size prior to watermark data being identified;

obtain at least a portion of a substitute video segment, wherein the portion of the substitute video segment is decoded in preparation for identifying watermark data in the video channel, and wherein the portion of the substitute video segment is associated with the picture-in-picture window;

identify the watermark data in a video frame of the video channel, the watermark data indicating a presence of a candidate portion of the video channel for content substitution; and display at least the portion of the substitute video segment in the picture-in-picture window, the substitute video segment replacing a video segment included in the video channel with the substitute video segment.

* * * * *